United States Patent [19]

Kifer et al.

[11] Patent Number: 4,956,394

[45] Date of Patent: Sep. 11, 1990

[54] CLOSED CELL PHENOLIC FOAM CONTAINING ALKYL GLUCOSIDES

[75] Inventors: Edward W. Kifer, Trafford; V ncent J. Wojtyna, Butler; James P. Colton, Trafford; Jeffrey T. Stickel, Pittsburgh, all of Pa.

[73] Assignee: Thermal Products International, Pittsburgh, Pa.

[21] Appl. No.: 449,732

[22] Filed: Dec. 12, 1989

[51] Int. Cl.$^5$ .................................................. C08J 9/14
[52] U.S. Cl. ................................ 521/84.1; 521/109.1; 521/181
[58] Field of Search .................... 521/84.1, 109.1, 181

[56] References Cited

U.S. PATENT DOCUMENTS

| | | | |
|---|---|---|---|
| 4,339,361 | 7/1982 | MacPherson et al. | 521/181 |
| 4,365,024 | 12/1982 | Frenzel | 521/181 |
| 4,412,014 | 10/1983 | Frenzel et al. | 521/181 |
| 4,423,163 | 12/1983 | Doerge | 521/181 |
| 4,444,912 | 4/1984 | Carlson et al. | 521/181 |
| 4,478,958 | 10/1984 | Carlson et al. | 521/181 |
| 4,485,194 | 11/1984 | Frenzel et al. | 521/181 |
| 4,518,719 | 5/1985 | Frenzel | 521/181 |
| 4,525,492 | 6/1985 | Rastall et al. | 521/181 |
| 4,539,338 | 9/1985 | Carlson et al. | 521/181 |
| 4,546,034 | 10/1985 | Frenzel | 521/181 |
| 4,563,499 | 1/1986 | Frenzel et al. | 521/181 |

*Primary Examiner*—Morton Foelak
*Attorney, Agent, or Firm*—Herbert J. Zeh, Jr.; Arnold B. Silverman

[57] ABSTRACT

The physical and mechanical properties of closed cell phenolic foam are improved by incorporating into certain foamable phenolic resole compositions small quantities of alkyl glucosides, particularly methyl glucosides. The alkyl glucosides also improve the process for preparing the closed cell phenolic foam.

23 Claims, 7 Drawing Sheets

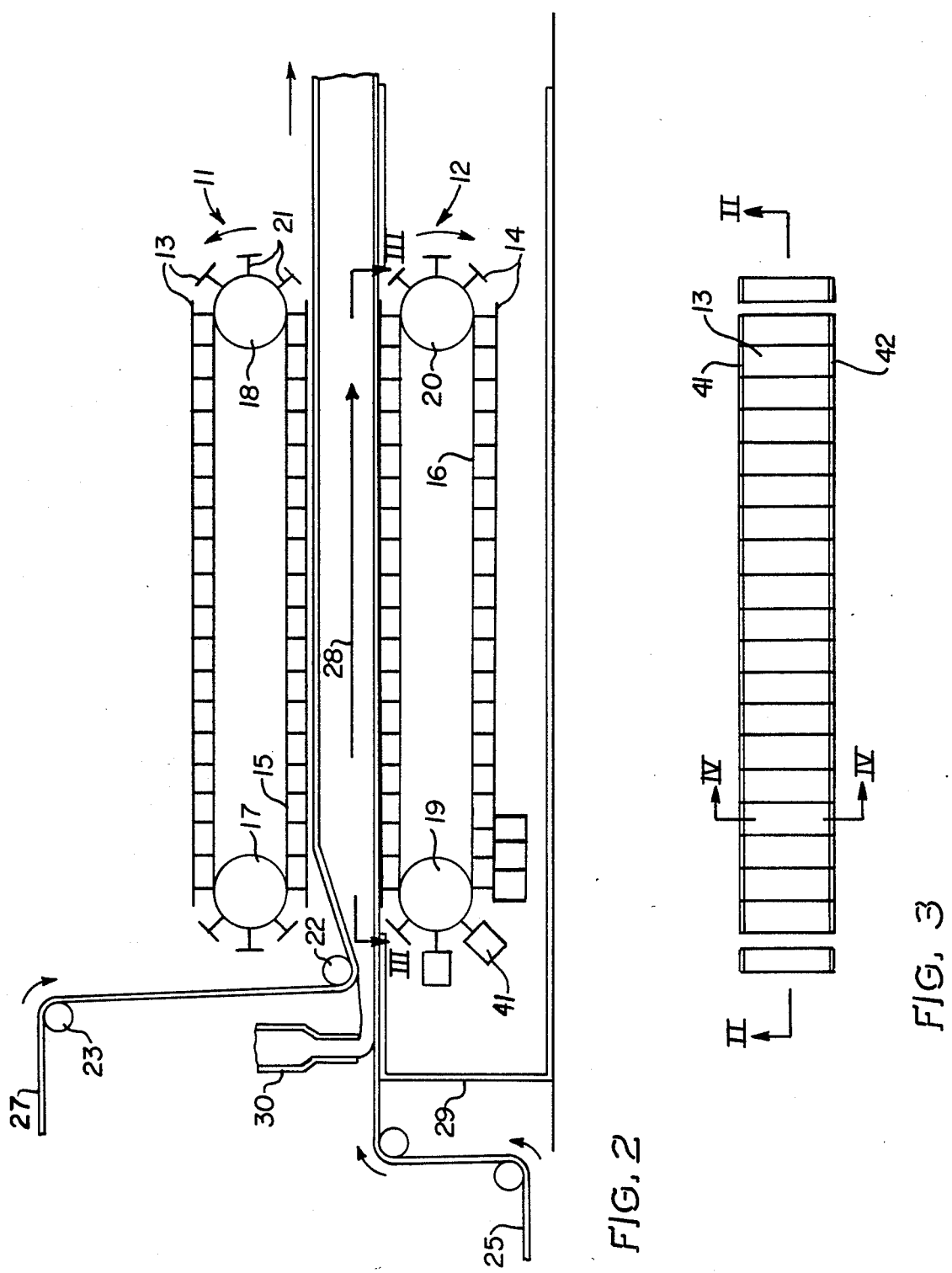

CLOSED CELL PHENOLIC FOAM CONTAINING ALKYL GLUCOSIDES

BACKGROUND OF THE INVENTION (1) Field of the Invention

The invention relates to closed cell phenolic foam insulation having improved physical and mechanical properties. The physical and mechanical properties which are improved include friability, facer adhesion, cell wall strength, shrinkage, compressive properties and appearance. The invention also relates to improvements to the process of preparing the closed cell phenolic foam insulation. The pressure temperature profile and foam viscosity are improved.

(2) Prior Art

Commercially acceptable closed cell phenolic foam insulation has been known for about the past eight years. Phenolic foam has the best fire rating of any known polymeric foam insulation. Phenolic foam does not sustain a flame even when contacted by the flame of a blow torch and gives off minimal amounts of toxic gases. Phenolic foams can stand temperatures of 375° F. without serious degradation. Phenolic foams have an ASTM-E-84 Steiner Tunnel Flame Spread Rating around 25, a fuel contribution of about 25 and a Smoke Developed Rating of about 25. In addition to having the best fire retardant properties available closed cell phenolic foam is the most efficient foam insulation available. Closed cell phenolic foam has an aged R value of 8.33 per inch. Additionally unlike many other high R foam insulations the thermal insulation properties of closed cell phenolic foam do not degrade over time.

Commercially acceptable phenolic foam having the properties described above and a composition for making the same are described in Doerge U.S. Pat. No. 4,423,163 and in Carlson et al. U.S. Pat. Nos. 4,444,912; 4,478,958 and 4,539,338. In accordance with these patents a commercially acceptable closed cell phenolic foam is prepared by foaming and curing a foamable resole composition comprising certain critical aqueous phenol formaldehyde resoles, chlorofluorocarbon blowing agent, surfactant and optional additives such as plasticizers and formaldehyde scavengers. The foaming and curing is accomplished with certain critical anhydrous aryl sulfonic acids in a substantially closed mold. The aqueous phenol formaldehyde resole is essentially a phenol formaldehyde condensation polymer having a molar ratio of formaldehyde to phenol of from about 1.7:1 to 2.3:1, preferable from 1.75:1 to 2.25:1 and most preferably about 2:1. The resole has a weight average molecular weight greater than 800 and preferably from 950-1500. The resole also has a number average molecular weight greater than about 350 and preferably from about 400 to 600 and a dispersivity greater than about 1.7 preferably from 1.8 to 2.6. The critical acid foaming and curing catalyst is an anhydrous aryl sulfonic acid having a pKa less than about 2.0 and which changes the compatibility of the phenolic resole with water sufficiently enough to prevent perforations and ruptures in the cell walls caused by water. The preferred anhydrous aryl sulfonic acid is a combination of toluene sulfonic acid and xylene sulfonic acid.

The general method for preparing closed cell phenolic foam using the compositions set forth above is well known. Generally, the foamable phenolic resole composition is prepared by admixing aqueous phenolic resole, blowing agent, surfactant, optional additives and acid curing catalyst into a substantially uniform mixture. The curing catalyst initiates the curing reaction which is highly exothermic. The exotherm of the curing reaction vaporizes and expands the blowing agent thereby foaming the compositions. The foaming is performed in a substantially closed mold.

The general method for the continuous manufacture of closed cell phenolic foam insulation board on a commercial scale is as follows. The foamable phenolic resole composition is prepared by continuously feeding into a suitable mixing device the aqueous phenolic resole, blowing agent, surfactant, optional additives and acid curing catalyst. The ratio of the various ingredients is varied depending on the desired density, thickness, etc. of the final product. The mixing device combines these ingredients into a substantially uniform composition which is continuously applied evenly onto a moving substrate which is usually a facer material for the foam such as glass fiber mat, cardboard or metal foil such as aluminum foil. The foaming composition is then covered with a facer material of usually the same type as the lower facer material. The foaming composition is then passed into a double belt press type apparatus where the curing exotherm continues to vaporize and expand the blowing agent, thereby foaming the composition as it is cured. During the foaming and curing the facer material is adhered to the foam.

Even though closed cell phenolic foam made with the compositions described above and in the general manner described above is the most efficient foam insulation and has the best fire properties, it can be improved. For example, the compressive strength or damage resistance of the closed cell phenolic foam is commercially acceptable. Damage resistance, however, is not as high as some competitive foam insulations. Similarly phenolic foam has commercially acceptable friability and punking properties, however, these properties are not as good as desired. The shrinkage of closed cell phenolic foam made in accordance with the prior art described above is also commercially acceptable but is not as low as desired. The adhesion of phenolic foam to the facer materials could also be improved even though the current adhesive strength does not present any significant problem. Similarly the strength of the cell walls of phenolic foam made as described above is very good, however it is always desirable to improve the strength of the cell walls. The strength and thickness of the cell walls are critical to the long term thermal performance of the phenolic foam. Weak cell walls will not withstand the thermal expansion and contraction that foam insulation undergoes. The appearance of the current closed cell phenolic foam is acceptable but it is always desirable to manufacture a better looking product. Finally, the general compositions and method described above can be readily practiced on a commercial scale, however, it is always desirable to make improvements to any commercial process.

Alkyl glucosides, particularly various methyl glucosides, are well known commercially available products. Methyl glucosides have been used in urethane foams as part of the polyol. Methyl glucosides can be used to manufacture polyester polyols and polyether polyols. When used as polyols for manufacturing urethane foam it is claimed in the literature that the methyl glucosides increase the dimensional stability of the urethane foam. Urethane and isocyanurate foam insulations have a tendency to grow and the methyl glucoside reduces the tendency of these foams to increase in size. It is also claimed that the methyl glucosides improve the flame properties of the urethane foam. The literature also claims that polyols made with methyl glucosides are compatible with the blowing agents, improve the viscosities of the foaming mixture and improve the reaction exotherm of the foaming urethane.

Methyl glucosides are also suggested for use in adhesives based on amino and phenol formaldehyde resoles. Methyl glucosides may be used as a comonomer or extender in adhesives made from phenol formaldehyde resoles or from urea phenol formaldehyde resoles. According to the product literature methyl glucoside as an extender or comonomer in adhesives based on urea phenol formaldehyde resoles or phenol formaldehyde resoles increases solution stability, improves resole clarity, improves flow properties, improves plasticization and reduces free formaldehyde. Additionally it is claimed that methyl glucosides improve the penetration of the adhesive into cellulosic materials, improve tack, improve glue performance and reduce glue consumption.

The product literature for methyl glucosides also claim that phenolic resin binders extended with methyl glucosides as a comonomer are useful as binders for thermal insulation. Phenolic resins binders containing 10-20 weight percent methyl glucosides are good binders for lose fill or heavy density fiberglass insulation and for intermediate or heavy density mineral wool. It is also mentioned that methyl glucoside are binders for phenolic foam insulation however phenolic foam insulation does not have binders.

Accordingly it is an object of the present invention to provide an improved closed cell phenolic foam and an improved method for making the same using alkyl glucosides, particularly methyl glucosides. In particular it is an object of this invention to improve the friability and damage resistance, reduce the shrinkage, increase the strength and thickness of the cell walls, and increase facer adhesion of closed cell phenolic foam by using small amounts of alkyl glucosides. The use of the glucosides also improve the process for making the closed cell phenolic foam by improving the pressure temperature profile and improving the foam viscosity.

Additional objects and advantages of the present invention will be apparent to those skilled in the art by reference to the following description and drawings.

SUMMARY OF THE INVENTION

The present invention comprises improved closed cell phenolic foam of the type having a k value of between 0.10 and 0.13 which does not increase substantially over time and which has uniform cell structure with cell walls substantially free of both ruptures and perforations. The phenolic foam of the present invention has improved friability properties, better damage resistance, thicker and stronger cell walls, lower shrinkage and increased facer adhesion. The present invention also improves the method of making closed cell phenolic foam. The improved method has a more acceptable temperature pressure profile and more acceptable foam viscosity properties.

The improved phenolic foam and the improved composition and method of making the phenolic foam is a direct result of the use of small amounts of alkyl glucosides, particularly methyl glucosides. Phenolic foam having small quantities of alkyl glucosides have improved properties compared to the prior art closed cell phenolic foam made without alkyl glucosides. In addition, small amounts of alkyl glucosides improve the process for making closed cell phenolic foam.

BRIEF DESCRIPTION OF THE DRAWINGS

Like numerals refer to like parts in the following drawings.

FIG. 2 illustrates diagrammatically a side view of cross section of a double belt press type apparatus useful in the continuous manufacturer of closed cell phenolic foam.

FIG. 3 illustrates diagrammatically a partial sectional view taken along line III—III of FIG. 2.

DETAILED DESCRIPTION OF THE INVENTION

Figure 1A:
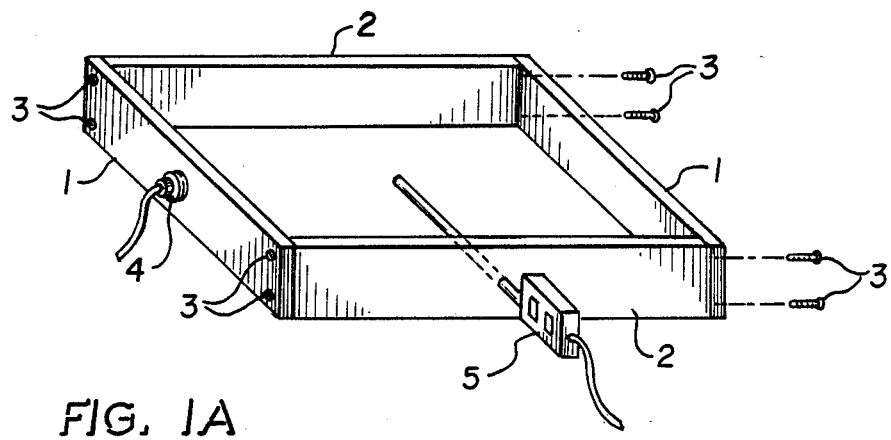
FIGS. 1A and 1B illustrate diagrammatically in partial cross section a type of substantially closed mold useful in making closed cell phenolic foam in the laboratory.

As mentioned above the present invention is directed to improved closed cell phenolic foam, improved composition for making the phenolic foam and an improved method for making the phenolic foam. The present invention is an improvement of the phenolic foam and the compositions and method for making the same that are set forth in U.S. Pat. No. 4,444,912; U.S. Pat. No. 4,478,958; U.S. Pat. No. 4,539,338 and U.S. Pat. No. 4,423,163. The specifications of these patents are hereby incorporated by references. The improvements of the present invention are a direct result of using small quantities of alkyl glucosides, particularly methyl glucosides.

The improved phenolic foam of the present invention is prepared by foaming and curing certain foamable phenolic resole compositions containing alkyl glucosides with certain anhydrous aryl sulfonic acids in a substantially closed mold. The foamable phenolic resole composition comprises an aqueous phenol formaldehyde resole, surfactant, blowing agent, alkyl glucosides, optional additives and anhydrous aryl sulfonic acid.

The aqueous phenolic resole of the present invention is essentially a phenol formaldehyde condensation polymer having a molar ratio of formaldehyde to phenol of from about 1.7:1 to about 2.3:1, preferably from about 1.75:1 to about 2.25:1 and most preferably about 2:1. The phenolic resole has a weight average molecular weight of a least about 800 and preferably from about 950 to 1500. The phenolic resole also has a number average molecular weight of at least about 350 and preferably from about 400 to about 600, and a dispersivity greater than 1.7, preferably from about 1.8 to 2 6. The aqueous phenolic resole may be a mixture of more than one resole as long as the resulting resole has the required characteristics.

The aqueous phenol formaldehyde resoles are prepared by reacting phenol and formaldehyde in the desired molar ratios in the presence of a basic catalyst until the resulting phenolic resole has the required molecular weight and dispersivity characteristics. The reaction may be accomplished using any of the well known prior art methods. For example, the phenol, formaldehyde and catalyst can be charged to a reactor in the desired molar ratios and reacted until the desired molecular weights are achieved. Alternatively, one or two of the ingredients can be charged to the reaction mixture over time. In the preferred method of preparing the aqueous phenolic resole, the phenol and basic catalyst are added to the reactor and the formaldehyde is metered in serially or continuously during the early part of the condensation reaction. The method for preparing the phenolic resole is not critical as long as the phenol and formaldehyde are condensed in the desired molar ratios and have the required molecular weight and dispersivity characteristics.

As mentioned before, the phenolic resole must have a molar ratio of formaldehyde to phenol of from about 1.7:1 to 2.3:1. If the ratio is higher than 2.3:1, then the resulting phenolic foam may have a residual free formaldehyde content that may create an odor problem. In addition, molar ratios exceeding 2.3:1 yield phenolic resoles that have too slow an exotherm and too high of a processing viscosity. Phenolic foams prepared from resoles having a molar ratio greater than 2.3:1 also tend to be too friable and have poor compressive strength. If the molar ratio is less than 1.7:1, then the resole has too low of a processing viscosity, resulting in thin cell walls. Phenolic resoles having molar ratios less than 1.7:1 also are too highly exothermic, making it difficult to entrap the blowing agent by keeping the cell walls from rupturing.

The phenolic resole must have a weight average molecular weight greater than 800, preferably between 950 and 1500. If the weight average molecular weight is less than 800, the phenolic resole is too reactive and not viscous enough. Phenolic resoles having weight average molecular weights less than 800 have a peak pressure and exotherm temperature which are both too quick and too high. These resoles also reach an exotherm temperature greater than 200° F. during this period. This rapid and high exotherm causes many of the cell walls to be ruptured and the blowing agent to be lost before the cells are formed. In addition, phenolic resoles with weight average molecular weights less than 800 yield foamable phenolic resole compositions that are not viscous enough during foaming and curing to form strong, thick cell walls. The phenolic resole tends to drain from the cell walls into the struts during foaming and early curing, thus forming cell walls that are thin. The thin cell walls are easily ruptured by the expanding blowing agent and have a tendency to crack upon drying and during use.

The upper limit on the weight average molecular weight is a practical limitation. Resoles having molecular weights in excess of 1500 tend to be very viscous and quite difficult to handle. However, they can be processed into acceptable foams.

The phenolic resoles have a number average molecular weight greater than about 350, preferably from about 400 to 600 and a dispersivity greater than about 1.7, preferably between 1.8 and 2.6. If the number average molecular weight is below 350 or the dispersivity less than about 1.7, then the phenolic resole has too low of a viscosity. In addition, the phenolic resole is too reactive, i.e., it has too high and too rapid an exotherm. It is difficult to entrap the blowing agent and prevent the rupturing of the cell walls. Phenolic foams made from these resoles also have thin cell walls. If the number average molecular weight is greater than about 600 or the dispersivity greater than 2.6, the resoles tend to be too viscous to handle and react too slowly. These upper values are practical limitations and acceptable foams can be prepared from resoles having number average molecular weights and dispersivities exceeding these levels.

The phenolic resoles of the present invention should have a free formaldehyde content of up to about 7 weight percent of the resole and a free phenol content of up to about 7 percent by weight. Preferably, the free formaldehyde and phenol are each less than about 4 percent by weight. Too much free formaldehyde may cause an odor problem. In addition, the free formaldehyde and phenol affect the reactivity and viscosity of the aqueous phenolic resole and foamable compositions.

The phenolic resoles of the present invention will generally have a viscosity of from about 1000 centipoises to about 20,000 centipoises at 16 percent water and 25° C. Preferably, the viscosity of the resole alone will be between about 6,000 and 10,000 centipoises. This results in a preferred viscosity of 10,000 to 15,000 centipoises after the alkyl glucoside is added. The viscosity is not a critical factor so long as the molar ratios, molecular weights, and dispersivity are as set forth herein. It is possible to manufacture phenolic resoles having the above viscosities but not having the required molecular weight and dispersivity. Such resoles are not part of the present invention. Resoles having viscosities within the above range, especially the preferred range, are desirable since they are easily formulated by conventional equipment into uniform foamable phenolic resole compositions.

In addition to phenol itself, other phenolic compounds may be substituted for up to about 10 percent of the phenol. Example of other suitable phenolic compounds include resorcinol; catechol; ortho, meta and para cresols; xylenols; ethylphenols; p-terbutylphenol and the like. Dinuclear phenolic compounds may also be used. The preferred phenolic resoles will contain primarily phenol itself, with only minor amounts, if any, of other phenolic compounds.

In addition to formaldehyde itself, other aldehydes may be substituted for up to about 10 percent of the formaldehyde. Examples of other suitable aldehydes are glyoxal, acetaldehyde, chloral, furfural and benzaldehyde. The preferred phenolic resoles will contain primary formaldehyde itself, with only minor amounts, if any, of other aldehydes. The term phenolic resole as used herein is meant to include resoles containing minor amounts of phenolic compounds other than phenol and/or minor amounts of aldehyde other than formaldehyde. The phenolic resoles are prepared in the manner as set forth in the patents incorporated herein by reference.

As mentioned above the foamable phenolic resoles compositions contain a blowing agent. Any suitable blowing agent may be used. In choosing the blowing agent it must be remembered that the k factor of the phenolic foam is directly related to the k factor of the blowing agent entrapped in the phenolic foam. Although blowing agents such as n-pentane, methylene chloride, chloroform and carbon tetrachloride may be used, they are not preferred since they do not have the excellent thermal insulation properties of chlorofluorocarbon blowing agents. In addition, chlorofluorocarbon blowing agents are not appreciably soluble in the phenolic foam and hence will diffuse out very slowly over an extended time, while some of the above mentioned blowing agents have a certain compatibility with the phenolic foam and hence may diffuse out somewhat more rapidly over time. They may be used, however, in combination with the preferred chlorofluorocarbon blowing agents. Examples of suitable chlorofluorocarbon blowing agents include: dichlorodifluoromethane; 1,2-dichloro-1,1,2,2-tetrafluoroethane; 1,1,1 trichloro-2,2,2 trifluoroethane; trichloromonofluoromethane; and 1,1,2-trichloro-1,2,2-trifluoroethane. It is preferred from a standpoint of insulation efficiency that the blowing agent comprise a chlorofluorocarbon blowing agent. The blowing agent may be a single blowing agent compound or it may be a mixture of such compounds. Ordinarily, the chlorofluorocarbon blowing agents employed have boiling points at atmospheric pressure, viz., an absolute pressure of 760 millimeters of mercury, in the range of from about $-5°$ C. to about 55° C. An atmospheric boiling point in the range of from about 20° C. to about 50° C. is typical. The preferred blowing agent is a mixture of trichloromonofluoromethane and 1,1,2-trichloro-1,2,2-trifluoroethane. It is especially preferred that the weight ratio of the trichloro-monofluoromethane to the 1,1,2-trichloro-1,2,2-trifluoroethane in the mixture be from about 3:1 to about 1:3.

It should be noted that chlorofluorocarbons are currently under attack by environmentalists and may be banned in whole or in part in the near future. Several non-CFC blowing agents are being evaluated for replacements for the current chlorofluorocarbons. The use of alkyl glucoside additives in phenolic foam is also of advantage in the utilization of the proposed non-CFC alternative blowing agents for insulating foams. This new family of blowing agents, typified by HCFC 123 and HCFC 141, are scheduled to be commercially available in the near future. The HCFC class of compounds can be used to produce closed cell phenolic foam using the alkyl glucoside additive. In fact, the use of alkyl glucoside is particularly advantageous in these systems because the improved foam viscosity partially alleviates processing problems arising from the increased mutual solvency of the HCFC/phenolic resin system. Additionally, other partially halogenated hydrocarbon blowing agents can be used in the foam making process.

The phenolic resole foamable composition also contains a surfactant. The surfactant should exhibit properties which enable it to effectively emulsify the blowing agent in the foamable composition. To prepare a good foam, the surfactant should lower the surface tension and stabilize the foam cells during expansion. It has been found that non-ionic, non-hydrolyzable silicone glycol surfactants are useful, although any surfactant having the requisite properties described above may be employed. Specific examples of suitable surfactants include L-7003 silicone surfactant, L-5350 silicone surfactant, L-5420 silicone surfactant, L-5340 silicone surfactant, all from Union Carbide Corporation, and SF1188 silicone surfactant from General Electric Company. Another class of surfactants which may be used are the non-ionic organic surfactants such as the condensation products of alkylene oxides suchas ethylene oxide, propylene oxide or mixtures thereof, and alkylphenols such as nonylphenol and dodecylphenol. Still another class of surfactants which may be used are the non-ionic organic surfactants such as the condensation products of alkylene oxides such as ethylene oxide, propylene oxide or mixtures therof, and triglycerides such as castor oil, hydrogenated castor oil and the like. Examples are G1284 and Arlatone-G from ICI Americas. Other suitable organic surfactants are known and include, for example, those disclosed in U.S. Pat. No. 3,389,094, so much of which as regards organic surfactants is hereby incorporated by reference.

Another class of suitable surfactants which may have application in the present invention include siloxane-oxyalkylene copolymers such as those containing Si-I-C as well as Si-C linkages. Typical siloxane-oxyalkylene copolymers contain a siloxane moiety composed of recurring dimethylsiloxy units endblocked with monomethylsiloxy and/or trimethylsiloxy units and at least one polyoxyalkylene chain composed of oxyethylene and/or oxypropylene units capped with an organic group such as an ethyl group. Specific examples of suitable siloxane-oxyalkylene polymers may be found in U.S. Pat. No. 3,271,331, so much of which as regards siloxane-oxyalkylene surfactants is hereby incorporated by reference. Care must be taken in selecting the surfactant since some surfactants will adversely affect the viscosity of the foamable phenolic resole composition or cause the collapse of the foam before it is set.

Although water is believed to be the main cause of perforations in the cell walls and to contribute to the rupturing of cell walls, the presence of water is necessary. First of all, it is very difficult and expensive to produce a phenolic resole that has very little or no water. Moreover, phenolic resoles having the characteristics of the resoles of the invention without water are extremely difficult to handle. They are very viscous and difficult to formulate into foamable compositions. In addition, it is difficult to control the exotherm of the reaction without water. Accordingly, water is necessary in the phenolic resole foamable composition to adjust the viscosity of the phenolic resole and the phenolic resole foamable composition to that which is favorable for producing phenolic foams. In addition, water is desirable to act as a heat sink and help control the exothermic foaming and curing reaction. Most of the water is present in the aqueous phenolic resole although very limited amounts may be tolerated in the fluorocarbon blowing agent or surfactant. Only very limited quantities may be tolerated in the anhydrous aryl sulfonic acid catalyst. The phenolic resole foamable composition will contain at least about 5 percent water. Concentrations of water above 20 percent should be avoided since even the preferred catalyst cannot expel sufficient water to substantially eliminate the ruptures and perforations when this much water is originally present in the foamable composition. An amount ranging from about 7 percent to about 16 percent by weight is preferred. As stated above, limited amounts of water can be tolerated in the blowing agent, surfactant, or catalyst if phenolic foam having cell walls free of perforations and ruptures caused by water are to be prepared. In addition, it is important that the water in the aqueous resole is uniformly mixed with the resole. If the aqueous resole contains liquid water that is not uniformly dissolved in the resole, the result may be ruptured cell walls.

As mentioned herein the improvements of the present invention are directly related to the use of small quantities of alkyl glucosides, particularly methyl glucosides. The glucosides are added to the foamable phenolic resole compositions. Methyl glucosides are readily abundant. Methyl glucosides can also be made from the acid catalyzed action of methanol on glucose. Methyl glucosides react with aqueous acids to yield hemiacetals but do not react with bases. Methyl glucosides are non reducing derivatives of glucose having two levels of reactivity among the hydroxyl groups. The alkyl glucosides of the present invention are represented by the following formula:

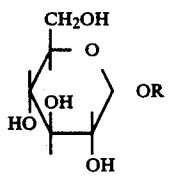

where R is selected from alkyl groups of 1-4 carbon atoms. The preferred glucosides are when R is methyl. It is within the scope of this invention to use a combination of one or more alkyl glucosides.

Alkyl glucosides come in two different isomers. One isomer is the alpha glucoside where the OR group is on the same side of the ring as the nearest OH group. The other isomer is beta glucoside where the OR group is on the opposite side of the ring from the nearest OH group. Either isomer or a mixture of the isomers are useful in the present inventions. The preferred isomer is the alpha glucoside and the preferred glucoside is alpha methyl glucoside.

Methyl glucosides are commercially available from Staley Continental. The commercial products are available as solids and solutions. Commercial products are available which are essentially 50/50 mixtures of the alpha/beta isomers. The preferred commercial products are those which are solids and which contain high concentrations of the alpha isomer. The preferred product is Sta Meg 104 which is a high purity crystalline solid of 90+ percent alpha methyl glucoside isomer.

The anhydrous aryl sulfonic acid catalysts that are useful in the invention are those aryl sulfonic acids which have a pKa of less than about 2.0, which have a high degree of compatibility with the phenolic resole and which lower the compatibility of the resole with water sufficiently enough to prevent both perforations and ruptures in the cell walls of the foam caused by water. Some of the useful anhydrous aryl sulfonic acid catalysts may be represented in the following formula:

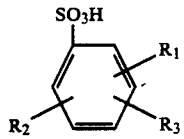

where $R_1$, $R_2$ and $R_3$ are independently selected from H, lower alkyl groups of 1-6 carbon atoms, $NH_2$, $SO_3H$, halogen, and non polar groups and where the sum of the carbons in $R_1$, $R_2$ and $R_3$ is less than 12. Some other useful anhydrous aryl sulfonic acids are the naphthalene sulfonic and substituted naphthalene sulfonic acids. The preferred catalysts are where $R_1$, $R_2$ and $R_3$ are selected from H and lower alkyl groups of 1-3 carbon atoms. It is also within the scope of this invention to use mixtures of anhydrous aryl sulfonic acids and, in fact, the most preferred catalyst is a combination of toluene sulfonic acid and xylene sulfonic acid. It should be noted that all acids of the present invention are not covered by the above formula nor are all acids covered by the above formula part of the invention. The criteria for determining whether an acid is part of the invention are whether the acid is a strong acid has a pKa of less than about 2.0 and changes the compatibility of the phenolic resole with water sufficiently enough to prevent perforations in the cell walls.

In addition to the aqueous phenolic resole, blowing agent, anhydrous aryl sulfonic acid, and surfactant, the phenolic resole foamable compositions of the present invention may contain other materials known in the art in their customary amounts for their customary purposes. Examples of such optional ingredients are as follows. Urea or resorcinol may be added to scavenge free formaldehyde, generally in the range of from 0.5 to 6.0 percent by weight. Plasticizers such as triphenyl phosphate, dimethyl terephthalate, dimethyl isophthalate or polymeric phthalates may also be added in amounts essentially from about 0.5 to 6 percent by weight. Antiglow, anti-spalling and anti-punking agents may also be added in amounts usually ranging from about 0.5 to 5 percent by weight. Preferred phenolic resole foamable compositions contain about 3 to 5 percent by weight plasticizer and from 2 to 4 percent scavenger. The plasticizer and scavenger are preferably premixed with the phenolic resole before it is mixed with the other ingredients of the foamable phenolic resole composition. The scavenger is preferably added within 24 hours of the time the phenolic resole is to be used.

The phenolic resole foamable composition comprises the aqueous phenolic resole (i.e. phenolic resole plus water) the blowing agent, the surfactant, the optional additives, the anhydrous aryl sulfonic acid and the alkyl glucosides. The ratios of the various ingredients are set forth below.

The amount of aqueous phenolic resole present in the phenolic resole foamable compositions used in the invention to produce substantially closed-cell phenolic foams may vary within wide limits provided it is in an amount sufficient to produce such foam having the desired physical and mechanical properties. Generally, the amount of phenolic resole present in the foamable composition ranges from about 40 percent to about 70 percent by weight of the composition. An amount in the range of from about 45 percent to about 55 percent by weight of the foamable composition is preferred. The weight percent of phenolic resole is based on 100 percent active phenolic resole. Since the resole is an aqueous solution, the actual concentration of the resole must be accounted for in calculating how much of the aqueous resole solution goes into the foamable phenolic resole composition.

The blowing agent generally is present in the foamable composition in an amount which will produce substantially closed-cell phenolic foam having an initial low k factor. The amount of blowing agent may vary widely but it generally ranges from about 2 percent to about 20 percent by weight of the foamable composition. An amount of blowing agent in the range of from about 5 percent to about 15 percent by weight of the foamable composition is typical. An amount in the range of from about 8 percent to about 12 percent by weight is preferred.

The surfactant used in the foamable composition may be a single surfactant or a mixture of surfactants. The surfactant is used in the present invention in an amount sufficient to produce a good emulsion. Generally, the amount of surfactant ranges from about 0.1 percent to about 10 percent by weight of the foamable phenolic resole composition. Typically, the amount of surfactant ranges from about 1 percent to about 6 percent by weight of the composition. An amount of surfactant of from about 1 percent to about 3 percent by weight of the composition is preferred.

The surfactant may be separately mixed with the phenolic resole, blowing agent and catalyst to form the foamable phenolic resole composition or it may be admixed with the phenolic resole or blowing agent before blending with the other components. Alternatively, part of the surfactant may be premixed with the phenolic resole and part may be premixed with the blowing agent.

The amount of anhydrous aryl sulfonic acid present in the phenolic resole foamable composition will vary depending on such factors as the amount of water in the foamable composition and the type and characteristics of the phenolic resole. Amounts of anhydrous aryl sulfonic acid in the range of about 2 to about 6 percent by weight are sufficient to foam and cure most phenolic resole compositions; however, this amount is insufficient to expel the water and produce phenolic foams without ruptures or perforations in the cell walls or to cure the resin fast enough to entrap the blowing agent. In accordance with the present invention, the anhydrous sulfonic acid is present in amounts of at least about 6 percent by weight of the foamable compositions. Less than 6 percent does not adequately control the effect of water on the formation of cell walls without ruptures or perforations or cure the phenolic resole quickly enough. The upper limit on the amount of anhydrous sulfonic acid used is determined by such factors as the amount and properties of the phenolic resole; however, amounts greater than 20 percent by weight generally cause the foaming and curing to exotherm too quickly and the properties of the resulting foam to be unacceptable. Amounts greater than 20 percent may be necessary if the acid is a monohydrate or if the foamable composition contains the maximum amount of water. The preferred amounts are from 13–17 percent by weight.

The amount of alkyl glucoside may vary from about 2 percent by weight of the total foamable composition to 12 percent by weight of the foamable composition. The preferred amount is from 5–9 percent with the most preferred amount being about 6–7.5 percent. Amounts of alkyl glucoside below 2 percent gives no apparent advantage over foam made without any alkyl glucoside. Amounts over 12 percent are deleterious. It should be noted that after the phenolic foam is manufactured and comes to equilibrium water concentration the foam will contain about 5 to 10% water. This water loss will make the amount of methyl glucoside actually found in the phenolic foam slightly higher than the concentration used in the foamable composition.

The alkyl glucoside may be added with the aqueous phenolic resole, blowing agent, surfactant, optional additives and acid catalyst to form the foamable compositions in any manner as long as a homogeneous composition is formed. It is preferred that the alkyl glucoside be added by premixing it with the phenolic resole before the final foamable compositions is formed. It is important that the alkyl glucosides be added after the reaction of preparing phenolic resoles is substantially completed. In order to obtain the maximum benefits of the present invention the alkyl glucosides are added after the completion of the manufacture of the phenolic resole. Accordingly the alkyl glucosides are preferably added after the pH of the phenolic resoles are adjusted from alkaline to a pH of about 4–6.

Although the alkyl glucosides are not prereacted with the phenolic resole, they do react with the phenolic resole during foaming and curing. Substantially all of the alkyl glucosides are reacted with the phenolic resole during the foaming and curing reaction to become part of the crosslinked phenolic foam. The alkyl glucosides are not present as physical mixtures in the foam as is the case with plasticizers.

The method for preparing the phenolic foam of the present invention generally comprises introducing into a substantially closed mold the phenolic resole foamable compositions of the present invention and allowing the composition to foam and cure in this mold while maintaining a pressure on the mold in excess of about 3 psi above atmospheric pressure. The phenolic resole foamable composition contains the special aqueous phenolic resole of this invention and the anhydrous aryl sulfonic acid catalyst to expel water, foam and cure the composition. The amount of phenolic resole foamable composition introduced into the mold will vary depending on the density, etc. desired of the phenolic foam but in all events will be an amount sufficient to generate a pressure against the walls of the mold of at least about 3 psi above atmospheric pressure.

The various components of the foamable phenolic resole composition may be mixed together in various orders provided the resulting composition is uniform. It should be noted, however, that the preferred anhydrous aryl sulfonic acid catalyst causes the foamable composition to begin to foam within seconds of being mixed with the phenolic resole and the foaming composition reaches a maximum pressure within minutes. Accordingly, the catalyst should be the last component added to the foamable phenolic resole composition. In the preferred continuous method, some of the components may be premixed before they are metered into the mixing device. However, for the reasons set forth above, the catalyst should be the last ingredient entering the mixing device.

The anhydrous aryl sulfonic acid may be added as a solid or liquid. Liquid acids are preferred because they are easier to handle in commercial mixing devices. The anhydrous catalysts may also be added as solutions, suspensions or emulsions in organic solvents such as glycerine or glycol. Solutions, suspensions or emulsions are not preferred since they add additional ingredients which may affect the properties of the phenolic foam and tend to reduce the reactivity of the system.

Figure 1B:
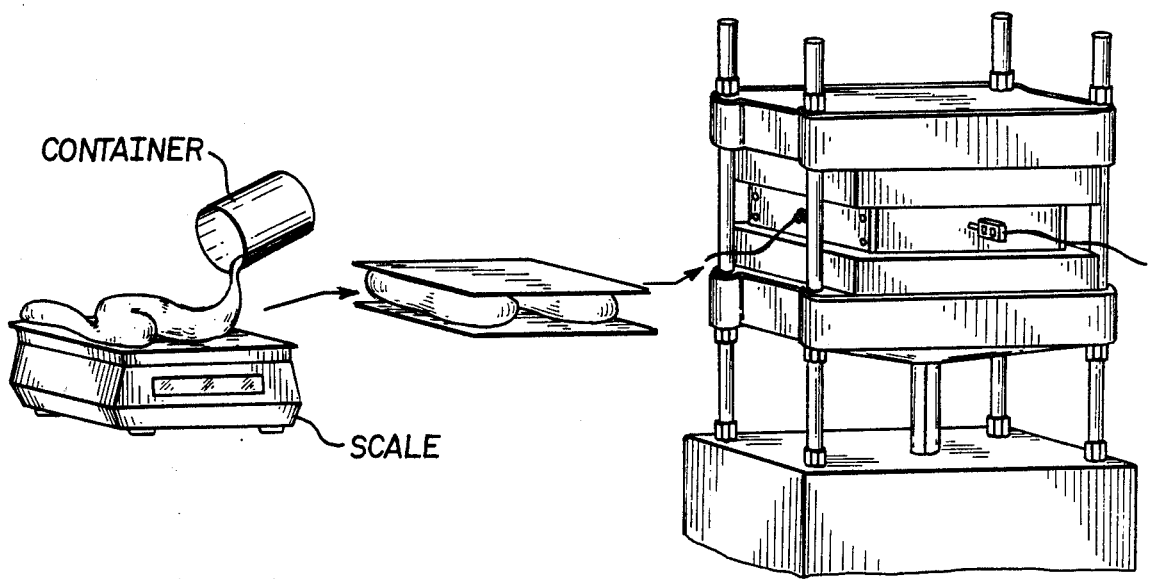

In one embodiment of the invention normally used in the laboratory, the phenolic resole foamable composition is introduced into a rigid, closed mold as illustrated, for example, in FIGS. 1A and 1B. The phenolic resole foamable composition expands initially under essentially atmospheric pressure. As the foamable composition expands to fill the mold, it generates pressure against the walls of the mold and the press. The mold and the press are designed to withstand pressures in excess of 15 psi above atmospheric pressure.

With respect to FIGS. 1A and 1B, the mold is comprised of a pair of opposing side walls (1), and a pair of opposing end walls (2) held together by screws (3). In order to withstand the pressures developed during foaming the mold is placed in a press of the type shown by FIG. 1B. The mold is also provided with a pressure transducer (4) for measuring the pressure in the mold and a thermocouple (5) for measuring the temperature in the mold. The operation of the laboratory mold will be described more fully hereinafter. The size of the mold can be varied by changing the dimensions of the walls.

Figure 4:
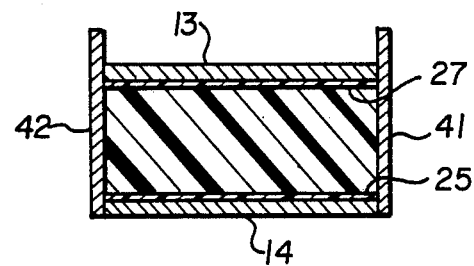
FIG. 4 illustrates diagrammatically a cross sectional view taken along lines IV—IV of FIG. 3.

In another embodiment of the invention employing a preferred continuous processing technique, the phenolic foam is produced in a double belt press type apparatus illustrated generally in FIGS. 2-4. The ingredients of the phenolic resole foamable composition of the present invention are metered in the desired ratios into a suitable mixing device (not shown) and then applied to a lower facing material (25) such as cardboard containing a thin layer of aluminum, a glass mat, a rigid substrate such as cardboard, or a vinyl skin, which material is caused to exit a container (not shown) and move along a table (29) by a lower conveyor (12). The phenolic resole foamable composition of the present invention is applied by means of a suitable distribution device (30) which moves in a back-and-forth motion transversely to the direction of movement of the lower facing material (25), although any suitable means for evenly distributing the composition such as a multiple stream mix head or a series of nozzles may be employed. As the foamable composition is carried downstream, it foams and is contacted by an upper facing material (27) directed by means of rollers (22) and (23) to the region where the foamable composition is in a very early stage of expansion. As the foamable composition expands initially under substantially ambient atmospheric pressure, it is carried into a curing cavity (28) formed by the lower portion of an upper conveyor (11), the upper portion of the lower conveyor (12), and moving side walls called deckles illustrated more clearly by (41) and (42) in FIG. 4. The thickness of the foam is determined by the distance of the upper conveyor (11) from the lower conveyor (12). The upper conveyor (11) can be moved by any suitable lifting means (not shown) perpendicularly to the lower conveyor (12) which, itself, is usually not raised or lowered. When the upper conveyor (11) is raised or lowered to vary the thickness of the insulation it moves between the deckles (41 and 42) as illustrated in FIG. 4, which deckles are rigidly attached to the sides of the lower pressure plates (14) and move with the lower pressure plates. The surfaces of the conveyors which contact the upper and lower facing materials comprise a plurality of pressure plates (13 and 14) fixed to the conveyor by rigid attaching means (21). The pressure plates may be heated, if necessary, by means of hot air which is introduced into and circulated inside the upper and lower conveyors by means of air ducts not shown in the drawings. As mentioned above, rigid sidewalls called deckles are attached to each side of each lower pressure plate. The upper pressure plate is slightly shorter than the lower pressure plates so that the upper pressure plate fits between the deckles to form a closed mold as illustrated in FIG. 4.

When the foam has expanded to fill the curing cavity, further expansion is constrained by the pressure plates (13 and 14) and deckles (41 and 42) as illustrated in FIG. 4. The pressure exerted by the foam on the pressure plates and deckles will vary as described herein but typically will be in the range of about 3 pounds per square inch above atmospheric to about 15 pounds per square inch above atmospheric. The pressure plates (13 and 14) and deckles (41 and 42) are designed and assembled to withstand such pressures.

Processing parameters such as the amounts of the components of the foamable phenolic resole composition, the flow rate of the composition from the distribution device, and the conveyor speed may be varied widely in the practice of the invention to provide phenolic foam having the desired density. Sufficient foamable composition must be used to ensure that the foaming composition fills the curing cavity and exerts a pressure against the cavity walls. The conveyor speed must be run at a speed to ensure that the foaming composition is in the mold before full expansion has taken place.

The closed cell phenolic foam of the present invention has uniform cell structure with cell walls substantially free of both ruptures and perforations. When chlorofluorocarbons are used as the blowing agent, the phenolic foam has an initial k value between 0.10 and 0.13 and the k value does not increase significantly over time. The closed cell phenolic foam of the present invention also has improved physical and mechanical properties compared to the prior art foam.

Figure 9:
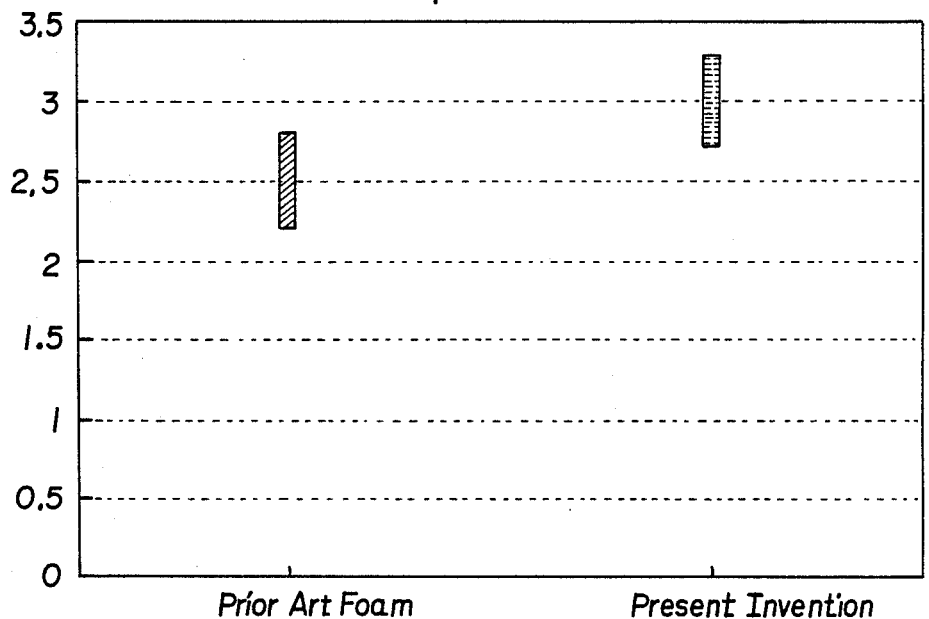
FIG. 9 is a graph illustrating the effect of methyl glucoside on damage resistance.

The phenolic foam of the present invention has improved damage resistance. The maximum percent deformation of the prior phenolic foam before failure was about 2.2 to 2.8 percent. In comparison the percent deformation before failure of the present invention is 2.7 to 3.3 percent. This property of the foam is important because if the foam is deformed above this point most of the resulting deformation cannot be recovered. This property is measured by subjecting the foam to a uniformly increasing load and measuring the amount of deformation present when the stress - strain curve deviates from a straight line in accordance with the general procedure of ASTM C-165-83. FIG. 9 compares the damage resistance properties of the foam of the present invention with the prior art phenolic foam and is based on measurements of many samples of phenolic foam.

Figure 10:
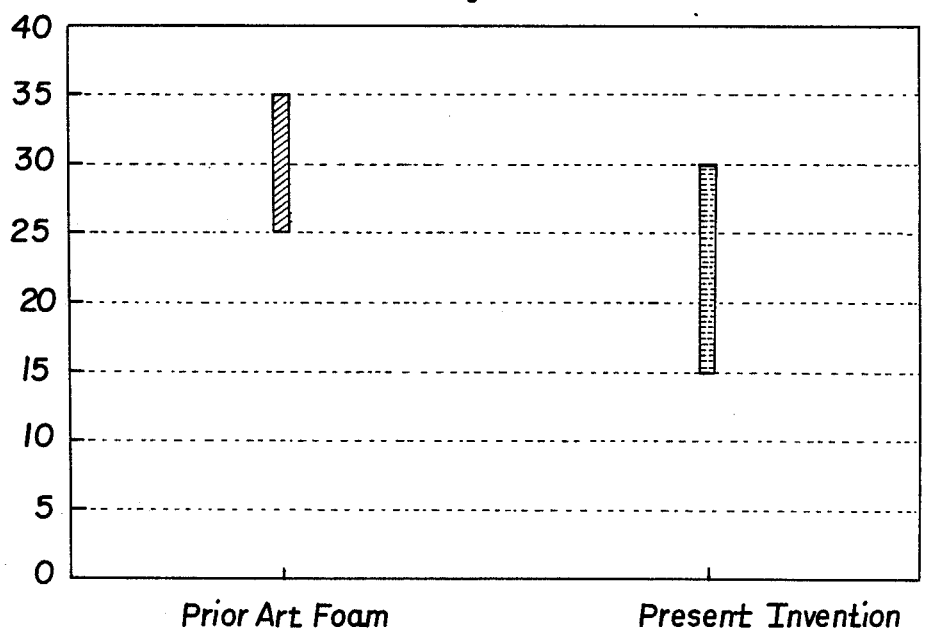
FIG. 10 is a graph illustrating the effect of methyl glucoside on friability.

The phenolic foam of the present invention has improved friability properties. The friability of the improved foam is substantially less than the friability of the prior phenolic foam. Friability is defined as the weight loss of a foam as the result of abrasion and impact produced by a tumbling apparatus in accordance with the general procedure of ASTM C-421-83. The friability of the prior foam was 25 to 35 percent, while the friability of the improved foam is from 15 to 30 percent. FIG. 10 compares the friability of the foam of the present invention with prior art phenolic foam and is based on the measurement of many samples of phenolic foam.

Figure 11:
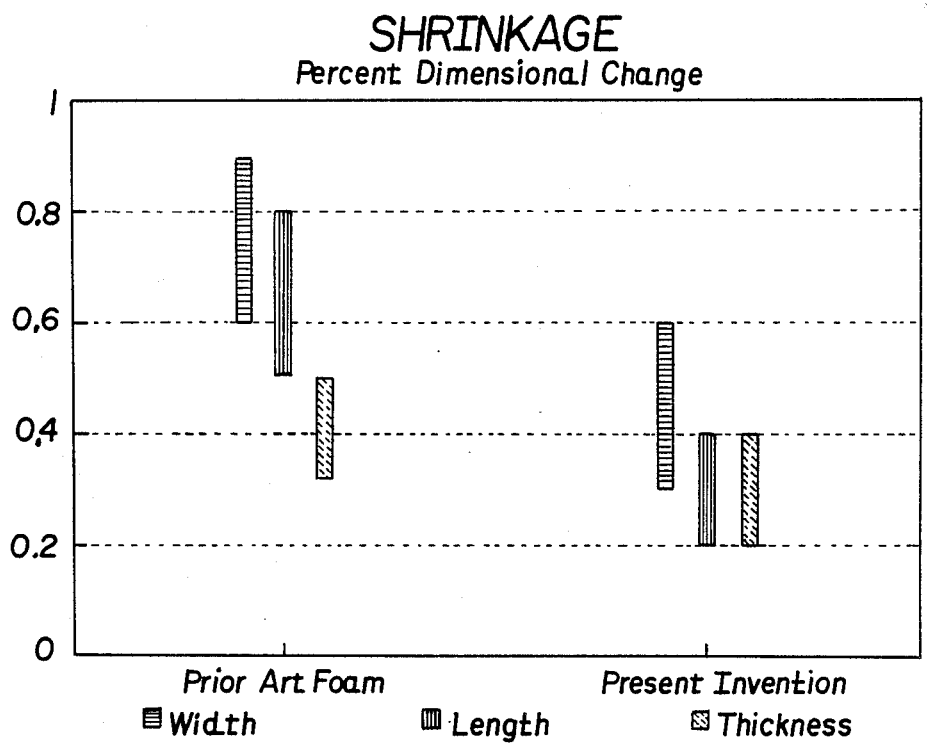
FIG. 11 is a graph illustrating the effect of methyl glucoside on foam shrinkage.

The shrinkage property of the phenolic foam of the present invention is also improved over the shrinkage property of the prior phenolic foam. The prior phenolic foam had shrinkage in the length direction of from 0.5 to 0.8%; in the width direction from 0.6 to 0.9%; and in thickness from 0.3 to 0.5%. The phenolic foam of the present invention has respective shrinkages of from 0.2 to 0.4%; from 0.3 to 0.6%; and from 0.2 to 0.4%, respectively. The shrinkage of the phenolic foam is important because of its effect on facer adhesion and dimensional stability of the product in use. FIG. 11 compares the shrinkage of the foam of the present invention with the prior art foam and is based on the measurement of many sample of phenolic foam.

The strength of the cell walls of the phenolic foam of the present invention is double that of the cell walls of the prior art foam. The strength of the cell walls is critically important. Strong cell walls provide long term entrapment of the blowing agent and allow the foam to withstand the pressure of thermal expansion and contraction that are experienced by thermal insulations.

Figure 12:
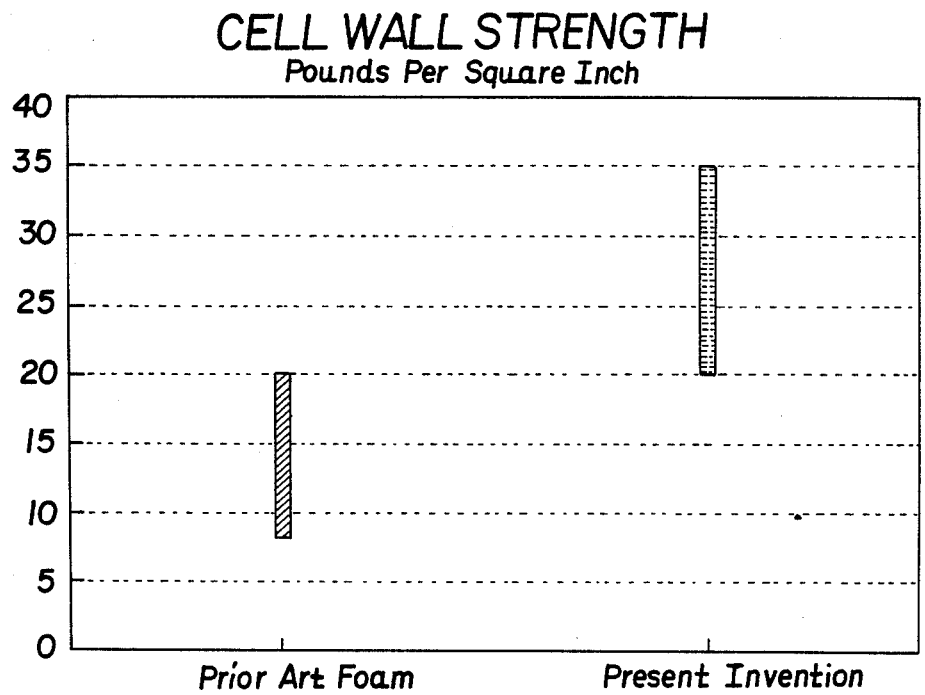
FIG. 12 is a graph illustrating the effect of methyl glucoside on cell wall strength.

The strength of the cell walls is conveniently measured by mercury intrusion porosimetry. The prior art foam had a cell wall burst strength of 8 to 20 psi, compared to a value of 20 to 35 psi for the improved foam of the present invention. FIG. 12 compares the cell wall strength of the foam of the present invention with prior art phenolic foam and is based on the measurement of many samples of phenolic foam. It was quite unexpected to be able to double the strength of the cell walls by using small quantities of alkyl glucoside.

Figure 5:
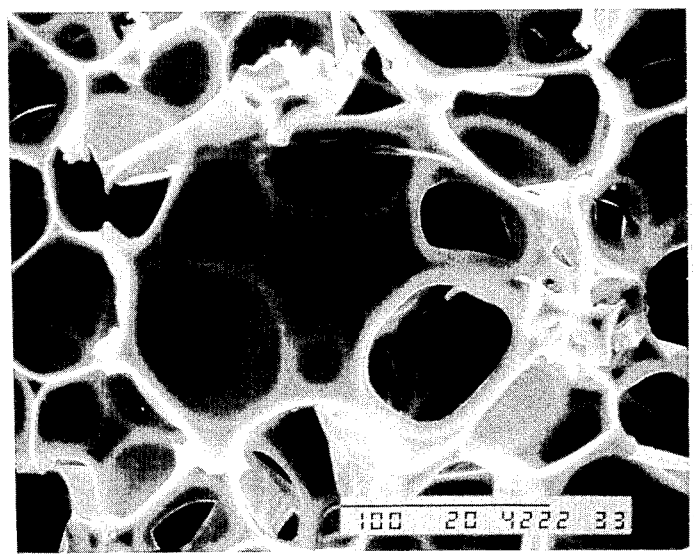
FIGS. 5-8 are scanning electron photomicrographs (SEMS) comparing the cells and cell walls of phenolic foam that are representative of the present invention with those that are representative of prior art phenolic foam.
Figure 6:
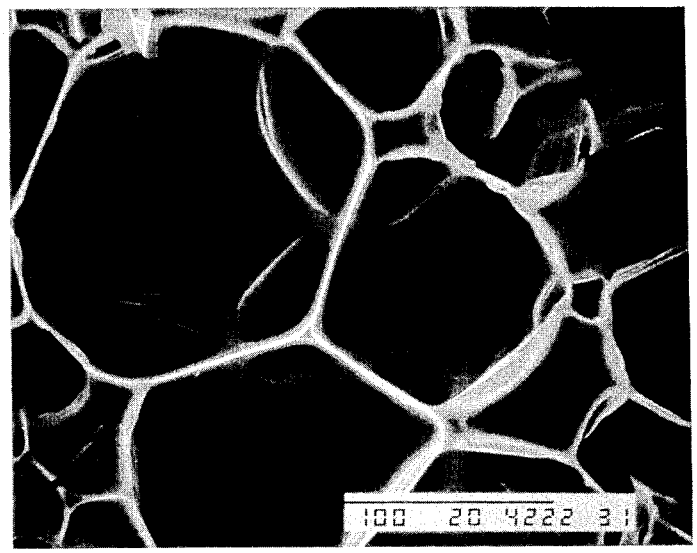
Figure 7:
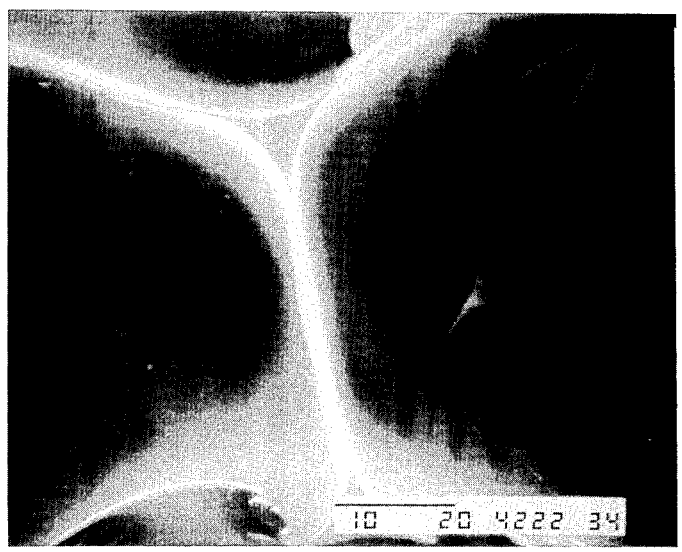
Figure 8:
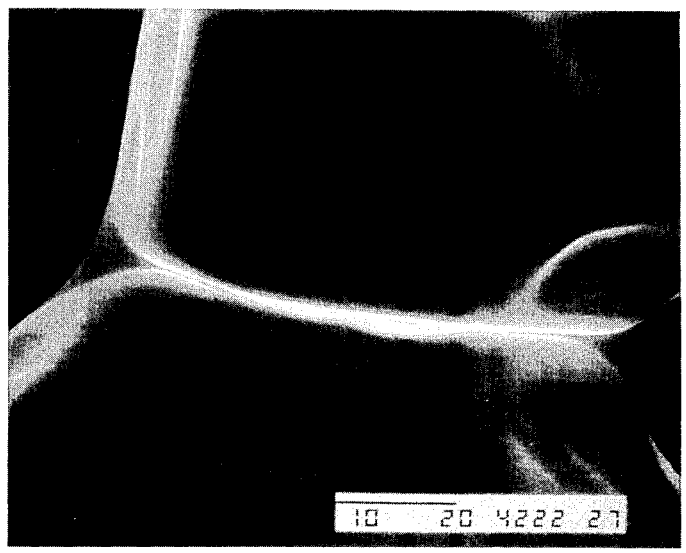

The improved cell wall structure is also illustrated by comparing FIG. 5 with FIG. 6 and FIG. 7 with FIG. 8. FIG. 5 is an SEM of prior art phenolic foam while FIG. 6 is an SEM of phenolic foam made using the preferred amounts of methyl glucoside. Both these SEMs are of 350X magnification. A comparison of these SEMs shows that the cell walls of the phenolic foam of the present invention are thicker than the cell walls of the prior art. The thicker cell walls may be more clearly observed by comparing FIG. 7 with FIG. 8, both SEMs of 2000X magnification. The cell walls of the prior art foam in FIG. 7 are thinner than the cell walls of the foam of the present invention in FIG. 8. This can particularly be seen in the triangular struts where the cell walls of three cells come together. The struts are thicker in the prior art foam because more resole is in the struts than in the cell walls.

Figure 13:
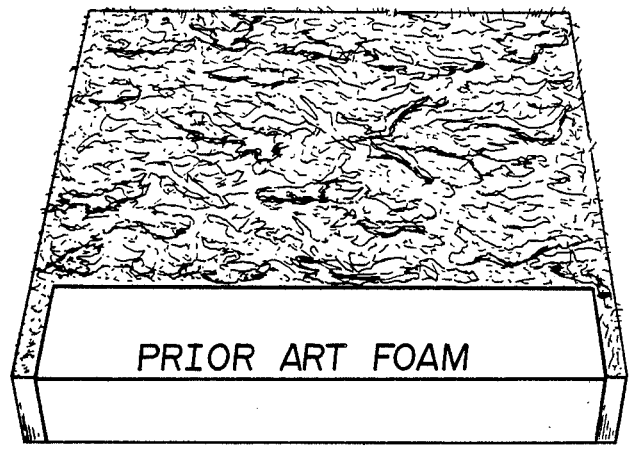
FIGS. 13 and 14 are photographs comparing facer adhesion of prior art foams with foams of the present invention.
Figure 14:
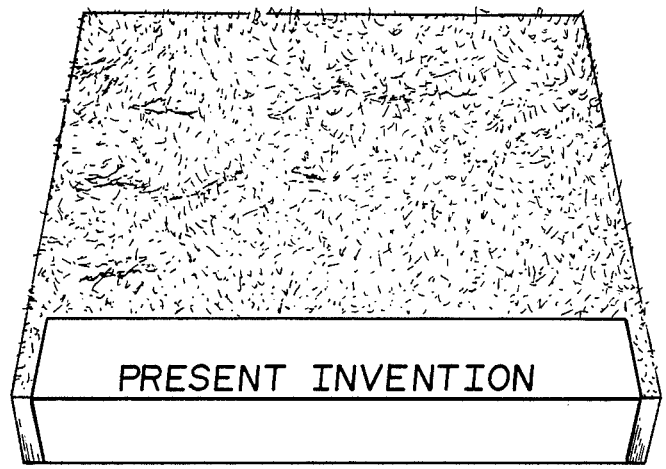

The phenolic foam of the present invention also has improved facer adhesion to fiberglass facers. Facer adhesion is important in roofing applications to provide adherence of the roofing membrane to the foam board. Typical facer adhesion of both the prior art foam and the improved foam are shown in FIGS. 13 and 14.

The phenolic foam of the present invention also has a more uniform appearance compared to the prior art foam. First the phenolic foam does not bleed through the facer material. Bleedthrough is potentially deleterious to foam performance, is unsightly, and reduces facer adhesion and flute spanability. Prior art phenolic foams had bleedthrough with glass mat facers.

The use of alkyl glucosides also improves the process for preparing the phenolic foam. In the prior art process for preparing the phenolic foam it was important to control the pressure temperature profile, i.e., the rate of curing and exotherm of curing. It was also important to control the viscosity of the foaming and curing mixture i.e. foam viscosity.

As mentioned herein in order to avoid perforations and ruptures in the cell walls caused by water, significant quantities of anhydrous aryl sulfonic acid are used. The amount of catalyst is several times that necessary for foaming and curing the phenolic composition. These large quantities of catalyst cause the reaction mixture to reach peak exotherm and peak pressures very rapidly. If the peak exotherm and pressure are reached too rapidly the cell walls will become brittle and crack thereby releasing the blowing agent. Accordingly it is necessary to control the temperature pressure profile. The use of small quantities of methyl glucosides moderates the curing reaction and makes it easier to control the temperature pressure profile.

As mentioned above it is also important to control the foam viscosity. If the foam viscosity gets too low the phenolic resole drains away from the cell walls and into the struts. This drainage causes thin cell walls. The thin cell walls may rupture during the foaming process. Additionally thin cell walls may crack over time. They cannot withstand the thermal expansion and contraction. It is possible to increase foam viscosity by using a more viscous starting resole. However this method of solving the foam viscosity problem cause more severe problems. High viscosity starting resole is very difficult to handle and very difficult to formulate into a homogeneous mixture with blowing agent, catalyst etc. The use of small amounts of alkyl glucosides improves the foam viscosity properties. It increases the viscosity during the foaming and curing but does not significantly reduce the processibility of the mixture.

The following examples illustrate the invention. Parts and percentages are by weight unless otherwise specified.

EXAMPLE 1

The following example sets forth the standard procedure used in the laboratory for making phenol formaldehyde resoles of the present invention. It is also an actual example of the making the phenol formaldehyde resoles used in the present invention.

A phenol formaldehyde resole having a molar ratio of formaldehyde to phenol of 2:1 of the present invention was prepared in the laboratory in a 4-liter reactor equipped with a reflux condenser, a thermocouple for reading temperatures in °C., an air stirrer with double blade impeller, and means for heating (mantle) and cooling (ice bath) the reactor. First, 1912.4 grams of 90 percent phenol (18.31 moles) was weighed out and added to the reactor. Then 35.53 grams of 45 percent aqueous KOH solution was added to the reactor and the phenol-KOH mixture heated to about 78° C. In the meantime 1207 grams of flake 91 percent paraformaldehyde (36.61 moles) was weighed out. When the reactor temperature reached 78° C., the paraformaldehyde was added incrementally over a 150-minute period. During the addition period, the temperature in the reactor was maintained in the range of 78° C. to 80° C. by heating and/or cooling the reactor.

After all of the phenol-KOH mixture was added, the reaction mixture was heated to 85° C.-88° C. and maintained at this temperature. Bubble viscosities were run at a temperature of 25° C. in a Gardner-Holdt bubble viscosity tube (ASTM D-1545-76) on samples of the reaction mixture taken every 30 minutes after the temperature reached 85° C.-88° C. When a bubble viscosity of about 15 sec. was obtained, the reaction mixture was cooled gradually (about 15 min.) to a temperature of about 68° C.-79° C. When this temperature was reached and maintained, bubble viscosities were again run every 30 minutes until a bubble of about 30 sec. was obtained. The bubble viscosities were then determined every 15 minutes until a bubble viscosity of about 60 sec. was obtained. At a 60 sec. bubble viscosity 14.57 grams of a 90 percent formic acid solution (0.285 mole) was added to the reactor and the reaction mixture cooled to 55° C. When the reactor temperature reached 55° C., 190 grams Morflex 1129 (dimethyl isophthalate) was added and allowed to dissolve. Then 195 grams of methyl glucoside (Sta Meg 104 was added and allowed to dissolve in the aqueous resole.

The reaction mixture was then transferred to a storage container and was stored in a refrigerator until used. The resulting resole had a Brookfield viscosity in centipoise at 25° C. of 7,600 before Sta Meg addition and 11,500 after addition. The resole contained 3 percent free phenol, 3.5 percent free formaldehyde, and 15 percent water. The weight average molecular weight was 1150, the number average molecular weight was 545, and the dispersivity was 2.11.

EXAMPLE 2

The following example sets forth the standard commercial scale process for making the phenolic resole of the present invention. It is also an actual example of a commercial production run.

A phenol formaldehyde resole of the present invention having a molar ratio of formaldehyde to phenol of 2:1 was prepared on a commercial scale in a 1,000-gallon reactor equipped with a reflux condenser, a thermocouple for reading temperatures in °C., means for accurately feeding chemicals to the reactor, means for agitating the mixture, and means for heating and cooling the reaction mixture.

First, 44,314 pounds of 90 percent phenol (424 lb. moles) was charged to the reactor. Then 773 pounds of 45 percent KOH was charged to the reactor with agitation. This mixture was stirred while being heated to 78° C. In the meantime 27,670 pounds of 92 percent flake paraformaldehyde (848 lb. moles) was weighed out and put into the chemical feeding equipment.

When the reactor temperature reached about 78° C., the paraformaldehyde was added to the reactor at a rate of 150 pounds per minute over a 3 hour period. During the addition period, the temperature in the reactor was maintained in the range of 78° C.–85° C. by heating and/or cooling the reactor or temporarily modifying the addition of the paraformaldehyde.

After all of the paraformaldehyde was added, the reaction mixture was heated to 85° C.–88° C. and maintained at this temperature. Bubble viscosities were run at a temperature of 25° C. in a Gardner-Holdt bubble viscosity tube (ASTM D-1546-76) on samples of the reaction mixture taken about every 30 minutes after the temperature reached 85° C.–88° C. When a bubble viscosity of about 15 sec. was obtained, the reaction mixture was cooled gradually to a temperature of about 68° C.–79° C. When this temperature was reached, bubble viscosities were again run every 15 minutes until a bubble of about 30 sec. was obtained. The bubble viscosities were then determined every 15 minutes until a bubble of about 60 sec. was obtained. At a 60 sec. bubble viscosity, 316 pounds of 90 percent formic acid solution (6.2 lb. moles) was added to the reactor and the reaction mixture cooled to 68° C. When the reaction mixture reached 68° C., 5,978 pounds of Sta Meg 104 was added and allowed to dissolve. Then 2,989 pounds of Terate 203 was added. The reaction mixture was then transferred to a storage tank and kept cool until used. The resulting resole had a Brookfield viscosity of 8 020 at 25° C. before Sta Meg addition and 12,205 after addition. The resole contained 3.3 percent free phenol, 2.8 percent free formaldehyde, and 13.7 percent water water. The resole had a weight average molecular weight of 1,125 a number average molecular weight of 533, and a dispersivity of 2.11.

EXAMPLE 3

The following example sets forth the standard laboratory method for preparing closed cell foam of the present invention. It is also an actual example of a closed cell foam of the present invention.

A phenolic foam was prepared in the laboratory using the laboratory mold illustrated in FIGS. 1A and 1B. The mold was made with ½ inch thick aluminum bars and had an inside dimension of 12"×12"×2". The dimensions of the mold may be modified for various thicknesses by replacing the 2" sides with the desired thickness.

The mold was coated with a mold release agent and placed in a heated press (from Wabash Metal Products) set at a temperature in the range of 140°–180° F. While the mold was in the press, the phenolic resin foamable composition was prepared as follows. First 11 parts of a 50/50 by weight blend of Freon 11/Freon 113 (trichloromonofluoromethane/1,1,2-trichloro-1,2,2-trifluoroethane) chlorofluorocarbon blowing agent was premixed with 0.1 part of a silicone surfactant (Union Carbide L-5340). This chlorofluorocarbon blowing agent mixture was put in an ice bath and cooled to 40°–55° F. Then 69.4 parts of an aqueous phenolic resole prepared as in Example 1 was mixed with the high speed air mixer with 2.8 parts of urea and 1.8 parts of Arlatone G surfactant. The chlorofluorocarbon blowing agent/surfactant premix was then mixed with the phenolic resole/scavenger/surfactant premix. This mixture of phenolic resole, blowing agent ant surfactant was cooled in the ice bath to 40°–55° F. Then 15 parts of an anhydrous toluene sulfonic/xylene sulfonic acid mixture was weighed into a syringe and cooled to 40°–45° F. The anhydrous aryl sulfonic acid catalyst was then mixed with the phenolic resole, blowing agent and surfactant mixture at a high RPM for approximately 15 seconds. Then 246 grams of the final phenolic resole foamable composition was immediately poured onto a 12"×12" glass fiber mat in an s-shaped fashion as shown in FIG. 1B and placed into the mold that was set in the heated press. Then a second 12"×12" glass fiber mat was placed on top of the foamable mixture and the press was closed immediately. The mixture with glass mats intact is left in the press for 4 minutes. After opening press and removing foam from mold, the foam is weighed. The foam is allowed to stand for 24 hours before cutting samples for evaluation of foam properties.

Many additional foamable phenolic resole compositions and phenolic foams were prepared in accordance with the general procedures set forth in the above examples. The phenolic foams prepared were analyzed to obtain the data in FIGS. 9–12 and to determine the ranges of the ingredients.

We claim:

1. An improved foamable phenolic resole composition of the type comprising aqueous phenol formaldehyde resole, surfactant, blowing agent, optional additives and anhydrous aryl sulfonic acid catalyst wherein the improvement comprises having from 2 to 12 percent by weight of the foamable phenolic resole composition of alkyl glucoside having an alkyl group of from 1 to 4 carbon atoms.

2. A composition as in claim 1 wherein the alkyl glucoside is from 5 to 9 percent by weight.

3. An improved foamable phenolic resole composition of the type comprising aqueous phenol formaldehyde resole, surfactant, blowing agent, optional additives and anhydrous aryl sulfonic acid catalyst wherein the improvement comprises having from 2 to 12 percent by weight of the foamable phenolic resole composition of methyl glucoside.

4. A composition as in claim 3 wherein the methyl glucoside is from 5 to 9 percent by weight.

5. A composition as in claim 3 wherein the methyl glucoside is alpha methyl glucoside.

6. An improved foamable phenolic resole composition of the type containing at least about 5 percent by weight water and comprising an aqueous phenol formaldehyde resole, surfactant, blowing agent optional additives and acid catalyst, the phenol formaldehyde resole having a molar ratio of formaldehyde to phenol of from about 1.7:1 to about 2.3:1, a weight average molecular weight greater than about 800, a number average molecular weight greater than about 350, and a dispersivity greater than about 1.7, the acid catalyst is an anhydrous aryl sulfonic acid having a pKa of less than about 2.0 and which reduces the compatibility of the phenolic resole with water sufficiently enough to prevent perforations and ruptures in cell walls of phenolic foam made from the composition, the anhydrous aryl sulfonic acid being present in concentrations of at least about 6 percent by weight, wherein the improvement comprises having from 2 to 12 percent by weight of the foamable phenolic resole composition of alkyl glucoside having an alkyl group of 1 to 4 carbon atoms.

7. A composition as in claim 6 wherein the alkyl glucoside is from 5 to 9 percent by weight.

8. An improved foamable phenolic resole composition of the type containing at least about 5 percent by weight water and comprising an aqueous phenol formaldehyde resole, surfactant, blowing agent, optional additives and acid catalyst, the phenol formaldehyde resole having a molar ratio of formaldehyde to phenol of from about 1.7:1 to about 2.3:1, a weight average molecular weight greater than about 800, a number average molecular weight greater than about 350, and a dispersivity greater than about 1.7, the acid catalyst is an anhydrous aryl sulfonic acid having a pKa of less than about 2.0 and which reduces the compatibility of the phenolic resole with water sufficiently enough to prevent perforations and ruptures in cell walls of phenolic foam made from the composition, the anhydrous aryl sulfonic acid being present in concentrations of at least about 6 percent by weight, wherein the improvement comprises having from 2 to 12 percent by weight of the foamable phenolic resole composition of methyl glucoside.

9. A composition as in claim 8 wherein the methyl glucoside is from 5 to 9 percent by weight.

10. A composition as in claim 8 wherein the methyl glucoside is alpha methyl glucoside.

11. An improved foamable phenolic resole composition of the type containing at least about 5 percent by weight water and comprising aqueous phenol formaldehyde resole, surfactant, blowing agent, optional additive and acid catalyst, the phenol formaldehyde resole having a molar ratio of formaldehyde to phenol of about 2:1, a weight average molecular weight greater than about 800, a number average molecular weight greater than about 350, and a dispersivity greater than about 1.7, the acid catalyst is an anhydrous aryl sulfonic acid having a pKa of less than about 2.0 and which reduces the compatibility of the phenolic resole with water sufficiently enough to prevent ruptures and perforations in cell walls of phenolic foam made from the composition the anhydrous aryl sulfonic acid is present in concentrations of at least about 6 percent by weight, wherein the improvement comprises having from 2 to 12 percent by weight of the foamable phenolic resole composition of methyl glucoside.

12. A composition as in claim 11 wherein the methyl glucoside is from 5 to 9 percent by weight.

13. A composition as in claim 11 wherein the methyl glucoside is alpha methyl glucoside.

14. A composition as in claim 12 wherein the methyl glucoside is alpha methyl glucoside.

15. An improved process for preparing phenolic foam comprising preparing a foamable phenolic resole composition containing at least about 5 percent by weight water comprising aqueous phenol formaldehyde resole, surfactant, blowing agent, optional additives and acid catalyst, and foaming and curing said composition in a substantially closed mold wherein the phenol formaldehyde resole has a molar ratio of formaldehyde to phenol of from about 1.7:1 to about 2.3:1, a weight average molecular weight greater than about 800, a number average molecular weight greater than about 350 and a dispersivity greater than about 1.7 and wherein the acid catalyst is an anhydrous aryl sulfonic acid having a pKa of less than about 2.0 and which reduces the compatibility of the phenolic resole with water sufficiently enough to prevent ruptures and perforations in cell walls of the phenolic foam and wherein the anhydrous aryl sulfonic acid is present in concentrations of at least about 6 percent by weight and wherein the improvement comprises having from .2 to 12 percent by weight of the foamable phenolic resole composition of alkyl glucoside having an alkyl group of 1 to 4 carbon atoms.

16. A process as in claim 15 wherein the alkyl glucoside is from 5 to 9 percent by weight.

17. An improved process for preparing phenolic foam comprising preparing a foamable phenolic resole composition containing at least about 5 percent by weight water comprising aqueous phenol formaldehyde resole, surfactant, blowing agent, optional additives and acid catalyst, and foaming and curing said composition in a substantially closed mold wherein the phenol formaldehyde resole has a molar ratio of formaldehyde to phenol of from about 1.7:1 to about 2.3:1, a weight average molecular weight greater than about 800, a number average molecular weight greater than about 350 and a dispersivity greater than about 1.7 and wherein the acid catalyst is an anhydrous aryl sulfonic acid having a pKa of less than about 2.0 and which reduces the compatibility of the phenolic resole with water sufficiently enough to prevent ruptures and perforations in cell walls of the phenolic foam and wherein the anhydrous aryl sulfonic acid is present in concentrations of at least about 6 percent by weight and wherein the improvement comprises having from 2 to 12 percent by weight of the foamable phenolic resole composition of methyl glucoside.

18. A process as in claim 17 wherein the methyl glucoside is from 5 to 9 percent by weight.

19. A process as in claim 17 wherein the methyl glucoside is alpha methyl glucoside.

20. An improved process as in claim 17 wherein the phenol formaldehyde resole has a molar ratio of formaldehyde to phenol of about 2:1, a weight average molecular weight greater than about 800, a number average molecular weight greater than about 350 and a dispersivity greater than about 1.7 and wherein the acid catalyst is an anhydrous aryl sulfonic acid having a pKa of less than about 2.0 and which reduces the compatibility of the phenolic resole with water sufficiently enough to prevent ruptures and perforations in cell walls of the phenolic foam and wherein the anhydrous aryl sulfonic acid is present in concentrations of at least about 6 percent by weight and wherein the alkyl glucoside is methyl glucoside.

21. A process as in claim 20 wherein the methyl glucoside is from 5 to 9 percent by weight.

22. A process as in claim 20 wherein the methyl glucoside is alpha methyl glucoside.

23. A process as in claim 21 wherein the methyl glucoside is alpha methyl glucoside.

* * * * *